(12) United States Patent
Ishikawa et al.

(10) Patent No.: US 6,579,618 B1
(45) Date of Patent: Jun. 17, 2003

(54) COATED OPTICAL FIBER AND RADIATION CURABLE RESIN COMPOSITION

(75) Inventors: Miyuki Ishikawa, Tsukuba (JP); Zen Komiya, Tsukuba (JP); Takashi Ukachi, Ushiku (JP)

(73) Assignees: DSM N.V., Heerlen (NL); JSR Corporation, Tokyo (JP)

( * ) Notice: Subject to any disclaimer, the term of this patent is extended or adjusted under 35 U.S.C. 154(b) by 0 days.

(21) Appl. No.: 09/604,303

(22) Filed: Jun. 26, 2000

Related U.S. Application Data

(63) Continuation-in-part of application No. 09/500,971, filed on Feb. 15, 2000, now abandoned, which is a continuation of application No. PCT/NL98/00464, filed on Aug. 14, 1998.

(30) Foreign Application Priority Data

Aug. 15, 1997 (JP) .............................. 97-235449

(51) Int. Cl.⁷ .............................. G02B 6/00; C08F 2/46
(52) U.S. Cl. .......................... 428/378; 522/96; 522/97; 522/173; 385/145
(58) Field of Search ............................ 428/378; 522/96, 522/173, 97; 385/145

(56) References Cited

U.S. PATENT DOCUMENTS

| | | | |
|---|---|---|---|
| 4,932,750 A | | 6/1990 | Ansel et al. |
| 4,962,992 A | * | 10/1990 | Chapin et al. |
| 4,973,611 A | | 11/1990 | Puder |
| 5,881,194 A | | 3/1999 | Duecker |
| 5,907,023 A | * | 5/1999 | Chawla |
| 5,977,202 A | * | 11/1999 | Chawla |
| 6,136,880 A | * | 10/2000 | Snowwhite et al. |
| 6,187,835 B1 | * | 2/2001 | Szum et al. |

FOREIGN PATENT DOCUMENTS

| | | |
|---|---|---|
| EP | 0301733 | 2/1989 |
| GB | 2163755 | 3/1986 |
| WO | 96/17000 | 6/1996 |
| WO | 97/19898 | 6/1997 |
| WO | 98/32780 | 7/1998 |
| WO | 99/08975 | 2/1999 |
| WO | 99/52958 | 10/1999 |

* cited by examiner

*Primary Examiner*—Susan W. Berman
(74) *Attorney, Agent, or Firm*—Pillsbury Winthrop LLP

(57) ABSTRACT

Provided is a radiation curable resin composition suitable for use as a primary coating material for optical fibers, which can form a cured coating with a low modulus of elasticity exhibiting a high breaking strength, and small light transmission loss; the coating composition comprises (A) a polymer containing polymerizable unsaturated groups in an average amount of 1.2 per molecule, a urethane bond in a molecular chain, and having a number average molecular weight from 3,000 to 30,000, (B) a poly-functional monomer having two or more polymerizable unsaturated groups, (C) a monomer having one polymerizable unsaturated group, and (D) a radiation active initiator. The secant modulus of the coating is less than 0.15 kg/mm², the tensile strength is more than 0.15 kg/mm².

25 Claims, 2 Drawing Sheets

US 6,579,618 B1

COATED OPTICAL FIBER AND RADIATION CURABLE RESIN COMPOSITION

CROSS REFERENCE TO RELATED APPLICATIONS

This application is a continuation-in-part of U.S. National application Ser. No. 09/500,971, which was filed on Feb. 15, 2000, now abandoned, which is a continuation of International Application PCT/NL98/00464, which designated the United States and was filed on Aug. 14, 1998. Both these applications are hereby incorporated in their entirety by reference. This application is furthermore a continuation-in-part of International Application PCT/NL99/00215, which designated the United States and was filed on Apr. 13, 1999, which is hereby also incorporated in its entirety by reference.

FIELD OF THE INVENTION

The present invention relates to a radiation-curable resin composition, and especially to a radiation-curable resin composition that is suitable as a coating material for substrates, in particular optical fibers.

BACKGROUND OF THE INVENTION

Optical fibers, especially, optical glass fibers, are fragile and easily damaged and hence these are coated with a coating material. The properties, specifically, the modulus of elasticity and the like of a coating film made of, for example, a UV-ray curable resin have a great influence on the transmission performances of optical fibers. When optical fibers are coated with a primary coating material having a high modulus of elasticity, the transmission loss of the optical fibers increases because of high lateral pressure. A material having a low modulus of elasticity is, therefore, desirable as the primary coating material. However, conventional coating materials having a low modulus of elasticity have the drawbacks that these materials have generally low breaking strength and are hence fragile. Specifically, it is desired that the modulus of elasticity of the primary coating material for optical fibers be 0.15 kg/mm$^2$ or less in terms of secant modulus, as determined according to JIS K7127, to absorb high lateral pressure. However, the breaking strength of cured products having such a low modulus of elasticity is as low as 0.15 kg/mm$^2$ or less in terms of the tensile strength at break, as determined according to JIS K7127. The products thus exhibit only poor practicability.

Furthermore, in spite of excellent transmission characteristics due to the low modulus of elasticity, such conventional radiation curable resin compositions have a drawback when used as the primary coating material for optical fibers. That is, when the primary coating material is removed to connect an optical fiber with another optical fiber, a portion of resinous material is left on the optical fibers. The complete removal of such resinous material remaining requires time-consuming procedures, impairing the processability of the material.

An object of the present invention is to provide a radiation-curable resin composition which is suitable for use as a substrate coating material, in particular, an optical fiber coating material, and, more particularly, as a primary coating material for optical fibers and which, after cure, has a high breaking strength while exhibiting a low modulus of elasticity.

Another object of the present invention is to provide a radiation curable resin composition suitable for use as a primary coating material for optical fibers, which can form a cured coating with a low modulus of elasticity exhibiting a high breaking strength and small light transmission loss, and yet be easily removed from optical fibers.

SUMMARY OF THE INVENTION

Accordingly, the present invention provides a coated optical fiber comprising: a coating having, a tensile strength at break of more than 0.15 kg/mm$^2$ and a secant modulus of 0.15 kg/mm$^2$ or less.

Furthermore the present invention provides a radiation curable resin composition comprising:
(A) a polymer containing polymerizable unsaturated groups in an average amount of 1.2 per molecule, a urethane bond in a molecular chain, and having a number average molecular weight from 3,000 to 30,000,
(B) a poly-functional monomer having two or more polymerizable unsaturated groups,
(C) a monomer having one polymerizable unsaturated group, and
(D) a radiation active initiator.

The composition can produce a cured product having at a thickness of 200 μm a secant modulus of 0.15 kg/mm$^2$ or less and a tensile strength of 0.15 kg/mm$^2$ or more when cured by ultraviolet radiation at a dose of 1 J/cm$^2$ in air.

The present invention further provides a radiation curable resin composition, which can produce a cured product having a total of at least two peaks or shoulders in a temperature range from −50° C. to +35° C., preferably at least one peak or shoulder in a temperature range from −50° C. to −20° C. and at least one peak or shoulder in a temperature range from −20° C. to +35° C., in a temperature dependency curve of loss tangent obtained from a temperature dependency measurement of a dynamic viscoelasticity ratio when cured by ultraviolet radiation at a dose of 1 J/cm$^2$ in air. Preferably this composition also comprises the above-mentioned components (A) through (D).

DETAILED DESCRIPTION OF THE INVENTION

Figure 1:
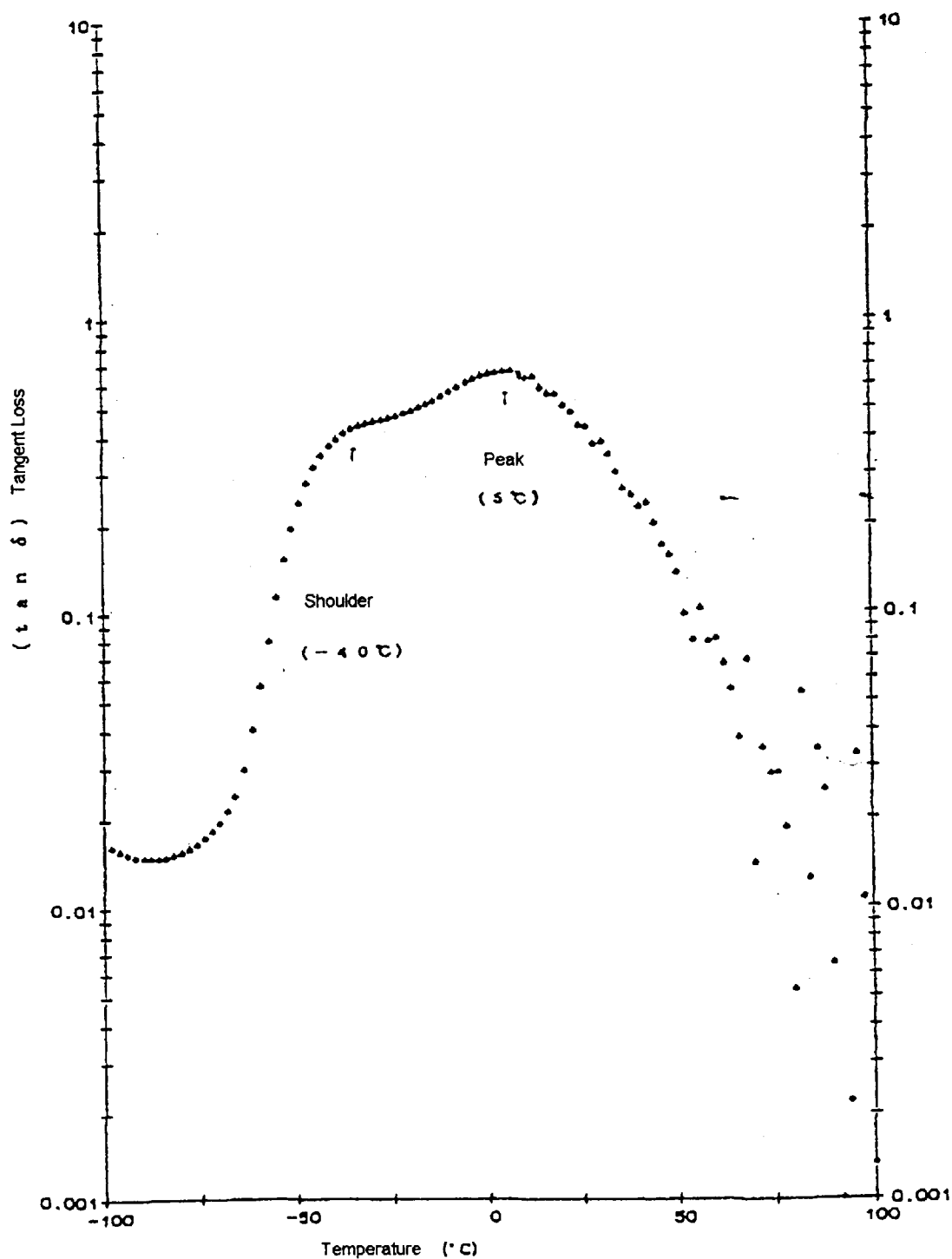
FIG. 1 shows a temperature dependency curve of loss tangent (plotted figure) of the cured product produced from the composition of Example 3.

The following words used in the present specification have, unless otherwise specified, the following meanings:

In a temperature dependency curve of loss tangent, the word "peak" means an apex of a convex curve in a limited area and "shoulder" means a shoulder or step in the same curve. A shoulder is present in the loss tan δ curve in case the derivative of the loss tangent curve shows a peak. "(meth)acrylic acid" refers to substituted and unsubstituted acrylic acid, methacrylic acid and mixtures thereof, with unsubstituted (meth)acrylic acid being preferred; "(meth) acryloyl group" refers to a substituted and unsubstituted acryloyl group, methacryloyl group and mixtures thereof, with the unsubstituted (meth)acryloyl group being preferred; "(meth)acrylate" refers to substituted and unsubstituted acrylate, methacrylate, and mixtures thereof, with unsubstituted (meth)acrylate being preferred.

Component (A)

Component (A) is a polymer composition comprising one or more types of polymers (having urethane bonds in a molecular chain and a number average molecular weight of 3,000–30,000) such that the total polymers present have on average 1.2 or more polymerizable unsaturated groups per molecule. The polymerizable unsaturated group in the present specification is a radical polymerizable ethylenically unsaturated group include, for example, (meth)acryloyl and (meth)acrylate groups. The average number of polymerizable unsaturated groups per polymer molecule in the polymer composition selected for component (A) is 1.2 or more, preferably from 1.2 to 4, and morepreferably from 1.5 to 2.5. Although an individual molecule of the polymer in the component (A) may have one or more polymerizable unsaturated groups, the average number of such a group per molecule should be 1.2 or more. If the average number of polymerizable unsaturated groups per molecule is less than 1.2, the resulting composition exhibits inadequate curability. If the average number of the polymerizable unsaturated groups is more than 4, on the other hand, the cross-linking reaction becomes excessive, resulting in brittle cured products.

The polymer (A) has a number average molecular weight of 3,000–30,000, and preferably 5,000–20,000. When the number average molecular weight is less than 3,000, cured products obtained from the composition tend to have poor elongation and low tenacity. When used as a coating material for the optical fibers, such a composition may result in a transmission loss of optical fibers. If the number average molecular weight is greater than 30,000, viscosity of the composition is excessively high, making it difficult to handle the composition with ease.

The polymer (A) contains an average of 1.2 or more, preferably 1.5–10, more preferably two or more, particularly preferable 2–10, and most preferably 2–6 urethane bonds in a molecular chain. If the average number of urethane bonds is less than 1.2, tenacity of the cured products produced from the composition is generally poor. Such a composition tends to result in transmission loss when used as a coating material for optical fibers.

Although the polymer (A) must have a limited number of polymerizable unsaturated groups, a minimum number of urethane bonds, and a limited average molecular weight as mentioned above, the structure of the main chain may comprise, for example, a polyether polyol urethane polymer, polyester polyol urethane polymer, polycaprolactone polyol urethane polymer, and the like. Either one type of these polymers may be used or two or more types may be used in combination in the polymer (A). It is especially desirable that the component (A) contain a polyether polyol urethane-based polymer. In this case, either all or a part of the component (A) may be a polyether polyol urethane-based polymer.

The polymer of the component (A) which has such a polyether polyol-type urethane polymer as a basic structure can be prepared by reacting (a) a polyether polyol obtained by the ring-opening polymerization of an alkylene oxide (hereinafter referred to as "polyether polyol (a)"), (b) a polyisocyanate (hereinafter "polyisocyanate (b)"), and (c) a compound possessing both an hydrogen capable of reacting with an isocyanate group and a polymerizable unsaturated group (hereinafter "compound (c)").

The polyether polyol (a) is a polyol, preferably a diol, having a polyoxyalkylene structure containing an oxyalkylene group with 2–10 carbon atoms as a repeating unit.

Given as examples of the diols having such a polyoxyalkylene structure are polyglycol compounds such as polyethylene glycol, polypropylene glycol, polytetramethylene glycol, polyheptamethylene glycol, polyhexamethylene glycol, and polydecamethylene glycol, as well as polyether diols obtained by a ring-opening copolymerization of two or more ion-polymerizable cyclic compounds.

The following cyclic diols are given as examples of the ion-polymerizable cyclic compound: ethylene oxide, propylene oxide, butene-1-oxide, isobutene oxide, 3,3-bis(chloromethyl)oxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, glycidyl acrylate, allyl glycidyl ether, allyl glycidyl carbonate, butadiene monoxide, isoprene monoxide, vinyl oxetane, vinyltetrahydrofuran, vinylcyclohexene oxide, phenyl glycidyl ether, butyl glycidyl ether, and glycidyl ester of benzoic acid. Of these cyclic ethers, ethylene oxide and tetrahydrofuran are preferred cyclic ethers.

In addition, polyether diols obtained by the ring-opening copolymerization of the above-mentioned ion-polymerizable cyclic compound and a cyclic imine such as ethyleneimine, a cyclic lactone such as p-propyolactone, a cyclic lactone such as glycolic acid lactide, or a cyclic siloxane such as dimethylcyclopolysiloxane can be used.

As specific combinations of two or more abovementioned ion-polymerizable cyclic compounds, combinations of tetrahydrofuran and propylene oxide, tetrahydrofuran and 2-methyltetrahydrofuran, tetrahydrofuran and 3-methyltetrahydrofuran, tetrahydrofuran and ethylene oxide, and propylene oxide and ethylene oxide can be given. These two or more ion-polymerizable cyclic compounds may be bonded randomly in the resulting ring-opening copolymer.

Diols having such a polyoxyalkylene structure are commercially available under the trademarks of, for example, PTMG1000 (Mitsubishi Chemical Corp.), PTMG2000 (same), PPG1000 (Asahi Oline Co., Ltd.), PPG2000 (same), EXCENOL2020 (same), EXCENOL1020 (same), PEG1000 (Nippon Oil and Fats Co., Ltd.), Unisafe DC 1100 (same), Unisafe DC 1800 (same), PPTG2000 (Hodogaya Chemical Co., Ltd.), PPTG1000 (same), PTG400 (same), and PTGL2000 (same).

A diol and/or diamine which does not have a polyoxyalkylene structure may be used jointly with the polyether polyol (a) in the manufacture of the polyether polyol urethane polymer used as the component (A). Here, as examples of the diol which does not have a polyoxyalkylene structure, a polyester diol, polycaprolactone diol, polycarbonate diol, and the like can be given. As examples of the polyester diol, polyester diols obtained by the reaction of a polyhydric alcohol, such as ethylene glycol, propylene glycol, tetramethylene glycol, 1,6-hexanediol, neopentyl glycol, or 1,4-cyclohexanedimethanol, and a polybasic acid, such as phthalic acid, isophthalic acid, terephthalic acid, maleic acid, fumaric acid, adipic acid, or sebacic acid, can be given. As the polycaprolactone diol, polycaprolactone diols obtained by reacting □-caprolactone and a diol such as ethylene glycol, tetramethylene glycol, 1,6-hexanediol, neopentyl glycol, or 1,4-butanediol can be given. As examples of the polycarbonate diol, a polycarbonate diol of polytetrahydrofuran, a polycarbonate of 1,6-hexanediol, as well as products commercially available under the trademarks of DN-980 (Nippon Polyurethane Industry Co., Ltd.), DN-981 (same), DN-982 (same), DN-983 (same), PC-8000

(PPG Co. of the U.S.), and the like can be given. As examples of the above-mentioned diamines, diamines such as ethylenediamine, tetramethylenediamine, hexamethylenediamine, p-phenylenediamine, 4,4'-diaminodiphenylmethane, diamines including a heteroatom, polyether diamines, and the like are given.

The polyisocyanate (b) is a compound having 2 to 6 isocyanate groups. Diisocyanate compounds are preferred. Specific examples of the diisocyanate compounds include 2,4-tolylene diisocyanate, 2,6-tolylene diisocyanate, 1,3-xylylene diisocyanate, 1,4-xylylene diisocyanate, 1,5-naphthalene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexyl methane diisocyanate, methylenebis(4-cyclohexylisocyanate), hydrogenated diphenylmethane diisocyanate, 2,2,4-trimethylhexamethylene diisocyanate, bis(2-isocyanatoethyl)fumarate, 6-isopropyl-1,3-phenyl diisocyanate, 4-diphenylpropane diisocyanate, lysine diisocyanate, and the like. It is preferred to use aliphatic isocyanates, in particular isophoronediisocyanate.

Examples of the foregoing compound (c) having an active hydrogen and polymerizable unsaturated group include (meth)acrylic compounds having a hydroxyl group. Specific examples are (meth)acrylates such as 2-hydroxyethyl (meth)acrylate, 2-hydroxypropyl(meth)acrylate, 2-hydroxyoctyl (meth)acrylate, pentaerythritoltri(meth)acrylate, glyceroldi (meth)acrylate, dipentaerythritolmonohydroxypenta(meth) acrylate, 1,4-butanediolmono(meth)acrylate, 4-hydroxycyclohexyl(meth)acrylate, 1,6-hexanediolmono (meth)acrylate, neopentylglycolmono(meth)acrylate, trimethylolpropanedi(meth)acrylate, and trimethylolethanedi(meth)acrylate, as well as (meth) acrylates represented by the following formulae (1) or (2):

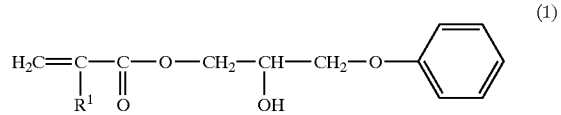

wherein $R^1$ represents a hydrogen atom or methyl group,

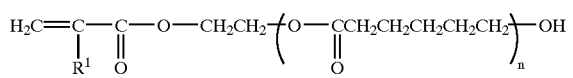

wherein $R^1$ represents a hydrogen atom or methyl group and n represents an integer of 1 to 5.

2-Hydroxyethyl(meth)acrylate can be given as a preferred compound among these (meth)acrylates.

Furthermore, compounds which do not have a polymerizable unsaturated group may be used in addition to compound (c). Specific examples are silane coupling agents such as γ-mercaptopropyltrimethoxysilane, γ-aminopropyltrimethoxysilane, γ-methacryloxypropyltrimethoxysilane, and alcohols such as methanol, isopropyl alcohol, ethanol, and butanol. An alcohol is used to replace polymerizable unsaturated groups of the component (A) with non-polymerizable groups. This can decrease the cross-linking degree of the cured products and, accordingly, the modulus of elasticity of the product. The silane coupling agents can be used not only for lowering the modulus of elasticity of the cured products, but also for increasing adhesion strength between the cured products and glass, or for making the surface of cured products slippery.

Polymer (A) may be prepared by reacting at least on polyol (a) with at least one polyisocyanate (b) and at least one compound (c) in accordance with procedures and in proportions known for forming such reactions. As for the polymer (A) forming reaction of the polyether polyol (a) with the polyisocyanate (b) and the compound (c), for example, when a diol compound is reacted with a diisocyanate compound and a compound having an ethylenic unsaturated group, it is desirable to use a urethanization catalyst such as copper naphthenate, cobalt naphthenate, zinc naphthenate, dibutyl tin dilaurate, triethylamine, 1,4-diazabicyclo[2.2.2]octane, or 2,6,7-trimethyl-1,4-diazabicyclo[2.2.2]octane in an amount of 0.01–1 part by weight for 100 parts by weight of the reaction components. The reaction is carried out at a temperature usually of 10–90° C., and preferably 30–80° C.

As mentioned above, inclusion of a polyether polyol-type urethane polymer in the polymer of the component (A) is desirable. The component (A) may consist only of a polyether polyol-type urethane polymer or may contain a polyether polyol-type urethane polymer as a major component combined with other polymers belonging to the component (A). As examples of other polymers belonging to the component (A), polyester polyol-type urethane polymer, polycaprolactone polyol-type urethane polymer, and the like can be given. When such other polymers are used together with polyether polyol-type urethane polymers at the same time, the proportion of a polyoxyalkylene structure contained in the component (A) is preferably at least 50 wt %, more preferably 60–93 wt %, and most preferably 70–90 wt %. The proportion of a polyoxyalkylene structure contained in the component (A) preferably does not exceed 98 wt %. If the amount of the polyoxyalkylene structure in the component (A) is too small, the modulus of elasticity of the cured products increases at a low temperature, for example at a temperature less than 0° C. This tends to produce a transmission loss of optical fibers when the composition is used as a coating material for optical fibers.

The proportion of the component (A) in the composition of the present invention is usually 25–75 wt %, and preferably 40–70 wt %. If the proportion of the component (A) is too small, the elongation of the cured products decreases; if too large, the viscosity of the composition increases, whereby the handling characteristics tend to be impaired.

Component (B)

Poly-functional monomers used as the component (B) of the present invention have two or more, usually 2–10, and preferably 2–6, polymerizable unsaturation groups. A (meth) acryloyl group is desirable as the polymerizable unsaturation group.

It is desirable for the composition of the present invention to contain a poly-functional monomer having a relatively low molecular weight for producing cured products with a high breaking strength, while exhibiting a low modulus of elasticity. Specifically, such a poly-functional monomer preferably has a comparatively low molecular weight, specifically a molecular weight less than 800, preferably 70–800, more preferably 100–800, particularly preferably 100–650, and most preferably 150–600. Preferable examples of such a poly-functional monomer include di, tri, and tetra(meth)acrylates, with di and tri(meth)acrylates being preferred, and those having a molecular weight of 800 or less being particularly preferred, such as trimethylolpropane tri(meth)acrylate, pentaerythritol(meth)acrylate, ethylene glycol di(meth)acrylate, tetraethylene glycol di(meth) acrylate, polyethylene glycol di(meth)acrylate, 1,4-butanediol di(meth)acrylate, 1,6-hexanediol di(meth) acrylate, 1,9-nonanediol di(meth)acrylate, neopentyl glycol di(meth)acrylate, trimethylolpropanetrioxyethyl(meth) acrylate, tris(2-hydroxyethyl)isocyanurate tri(meth)acrylate, tris(2-hydroxyethyl)isocyanurate di(meth)acrylate, tricyclodecanedimethanol di(meth)acrylate, epoxy(meth)acrylate produced by the addition of (meth)acrylate to diglycidyl ether of bisphenol A, and 3-methyl-1,5-pentanediol diacrylate. Of these, 1,6-hexanedioldiacrylate, 1,9-nonanediolacrylate, triethylene glycol diacrylate, tricyclodecanedimethanol diacrylate, and trimethylolpropane alkoxy triacylate are desirable poly-functional monomers in view of the low modulus of elasticity and high breaking strength of the resulting cured products. Particularly preferred polyfunctional monomers are 1,6-hexanedioldiacrylate, 1,9-nonanedioldiacrylate, triethylene glycol diacrylate, and tricyclodecanedimethanol diacrylate. These monomers may be used either individually or in combinations of two or more as the component (B).

These poly-functional monomers are commercially available under the trademarks of, for example, HDDA, L-C9A (Daiichi Kogyo Seiyaku Co., Ltd.), Yupimer UV, SA1002, SA2007 (Mitsubishi Chemical Corp.), 3-EGA, 4-EGA, 9-EGA, 14-EGA (Kyoeisha Chemical Co., Ltd.), PHOTOMER4149 (Sunnopco Co., Ltd.), Viscoat 700 (Osaka Organic Chemical Industry Co., Ltd.), KAYARAD R-604, DPCA-20, 30, 60, 120, HX-620, D-310, 330 (Nippon Kayaku Co., Ltd.), Aronix M-210, 215, 315, 325 (Toagosei Co., Ltd.), and A-MPD (Shin-Nakamura Chemical Co., Ltd.).

It is desirable that the poly-functional monomer is included in the composition of the present invention as the component (B) in an amount of 0.1–10 wt %, and especially 0.5–5 wt %. If the proportion of the component (B) is too small, the breaking strength of the resulting cured products decreases. If this proportion too large, the modulus of elasticity of the cured products is exceedingly high and elongation is decreased. Such a product is not suitable as a primary coating material for optical fibers.

Component (C)

Polymerizable unsaturated group containing monomers suitable as component (C) in the coating composition of the present invention include, for example, monomers possessing only one polymerizable unsaturated group, such as a vinyl group, and a molecular weight of 1,000 or less, and preferably from 70 to 800. Although there are no limitations to the kind of polymerizable vinyl group, it is desirable that a (meth)acryloyl group, N-vinyl group, (meth)acrylamide group, vinyl ether group, vinyl ester group, or the like be contained as the polymerizable vinyl group. Among these, a (meth)acryloyl group is particularly preferred.

The component (C) functions as a reactive diluent in the composition of the present invention. Therefore, it is desirable for the component (C) to be a liquid at 25° C. It is possible to adjust viscosity of the composition and modulus of elasticity of the cured products obtained from the composition by suitable selection of the types and amount of the compound, which is used as the component (C). If component (C) is composed of a plurality of compounds, the selected compounds are preferably liquids when mixed and result in a mixture that is liquid at 25° C.

The following monomers are given as specific examples of the compounds used as component (C): 2-hydroxyethyl (meth)acrylate, 2-hydroxypropyl(meth)acrylate, 2-hydroxybutyl(meth)acrylate, methyl(meth)acrylate, ethyl (meth)acrylate, propyl(meth)acrylate, isopropyl(meth) acrylate, butyl(meth)acrylate, amyl(me)methacrylate, isobutyl(meth)acrylate, t-butyl (meth)a&crylate, pentyl (meth) acrylate, isoamyl(meth)acrylate, hexyl(meth) acrylate, heptyl(meth)acrylate, octyl(meth)acrylate, iso-octyl (meth) acrylate, 2-ethylhexyl (meth) acrylate, nonyl (meth)acrylate, decyl(meth)acrylate, iso-decyl(meth) acrylate, undecyl(meth)acrylate, dodecyl(meth)acrylate, lauryl(meth)acrylate, octadecyl(meth)acrylate, stearyl(et) methacrylate, tetrahydrofurfuryl (meth) acrylate, butoxyethyl(meth)acrylate, ethoxydiethylene glycol (meth) acrylate, benzyl(meth)acrylate, cyclohexyl(meth)acrylate, phenoxyethyl(meth)acrylate, polyethy lene glycol mono (meth )acrylate, polypropylene glycol mono(meth)acrylate, methoxyethylene glycol (meth)acrylate, ethoxyethyl(meth) acrylate, methoxypolyethylene glycol (meth)acrylate, methoxypolypropylene glycol (meth)acrylate, dicyclopentadienyl(meth)acrylate, dicyclopentanyl(meth) acrylate, dicyclopentenyl(meth)acrylate, tricyclodecanyl (meth)acrylate, isobornyl(meth)acrylate, bornyl(meth) acrylate, diacetone(meth)acrylamide, isobutoxymethyl (meth)acrylamide, N-vinylpyrrolidone, N-vinylcaprolactam, N-vinylformaldehyde, N,N-dimethyl (meth)acrylamide, t-octyl(meth)acrylamide, dimethylaminoethyl(meth)acrylate, diethylaminoethyl (meth)acrylate, 7-amino-3,7-dimethyloctyl(meth)acrylate, N,N-diethyl(meth)acrylamide, N,N'-dimethylaminopropyl (meth)acrylamide, (meth)acryloyl morpholine, hydroxybutyl vinyl ether, lauryl vinyl ether, vinyl ethers such as cetyl vinyl ether, 2-ethylhexyl vinyl ether, maleic acid esters, fumaric acid esters, compounds shown by the following formulas (3)–(5):

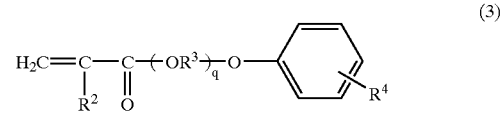

(3)

wherein $R^2$ represents a hydrogen atom or methyl group, $R^3$ represents an alkylene group having 2–6, preferably 2–4, carbon atoms, $R^4$ represents a hydrogen atom or an alkyl group having 1–12, preferably 1–9, carbon atoms, and q represents an integer of 0–12, preferably 1–8,

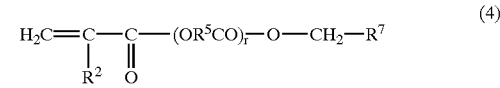

(4)

wherein $R^2$ represents the same as defined above, $R^5$ represents an alkylene group having 2–8, preferably 2–5, carbon atoms, $R^7$ represents a tetrahydrofuryl group, and r represents an integer of 1–8, and preferably 1–4, and

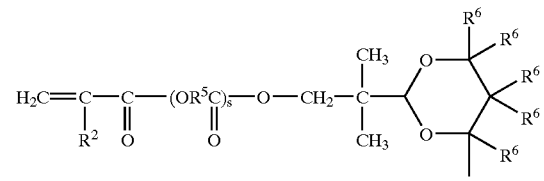

wherein $R^2$ and $R^5$ represent the same as defined previously, each $R^6$ independently represents a hydrogen atom or methyl group, and s represents an integer of 1–15.

As specific examples of the compound shown by the formula (3), nonylphenol EQ-modified (8 mole modified)

acrylate, phenol EO-modified (4 mole modified) acrylate, nonylphenol EO-modified (4 mole modified) acrylate, nonylphenol PO-modified (2.5 mole modified) acrylate, nonyl phenol EO-modified (1 mole modified) acrylate, and phenol EO-modified (2 mole modified) acrylate are given. Here, "EQ-modified" means "modified with ethylene oxide" and "PO-modified" means "modified with propylene oxide".

The compounds described above may be used either individually or in combinations of two or more.

Of the above-described compounds, it is desirable for the component (C) to include N-vinyllactams such as N-vinylpyrrolidone and N-vinyl-□-caprolactam (hereinafter referred to as "N-vinylcaprolactam"), and the like. It is preferred that the proportion of N-vinyllactam in component (C) is from 3–20 wt %, and more preferably 3–15 wt %. N-vinylcaprolactam is prefered.

Inclusion of a compound with an alicyclic structure is desirable for the component (C) to increase water resistance, hot water resistance, acid resistance, and alkali resistance of the cured products, thus ensuring long-term reliability of the products. As examples of such monomers having an alicyclic structure, particularly, alicyclic (meth)acrylate compounds, isobornyl(meth)acrylate, dicyclopentenyl (meth)acrylate, tricyclodecanyl(meth)acrylate, cyclohexyl (meth)acrylate, tricyclodecanedimethanoldi(meth)acrylate, and the like can be given. Of these, isobornyl acrylate and tricyclodecanedimethanoldiacrylate are preferred.

A combined use of the above-mentioned N-vinyllactam and the compound having an alicyclic structure as the component(C) is given as a preferred embodiment.

These compounds for the component (C) are commercially available under the trademarks such as Aronix M-102, M-111, M-113, M-114, M-117 (Toagosei Co., 4:if Ltd.), KAYARAD TC110S, R629, R644 (Nippon Kayaku Co., Ltd.), and VISCOAT 3700 (Osaka Organic Chemical Industry Co., Ltd.).

It is desirable that the component (C) be incorporated in the composition of the present invention in an amount of 20–70 wt %, and preferably 25–55 wt %.

Component (D)

Examples of radiation-active initiators suitable for use as component (D) in the present invention include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-on, 2,4,6-trimethylbenzoyl diphenylphosphine oxide, and bis(2,6-dimethoxybenzoyl)-2,4,4,-trimethylpentylphosphine oxide. These compounds may be used either individually or in combinations of two or more. Among these, 2,4,6-trimethylbenzoyldiphenylphosphine oxide, bis(2,6-dimethoxybenzoyl)-2,4,4-trimethylpentylphosphine oxide, and 1-hydroxycyclohexylphenyl ketone are particularly preferred.

The following can be given as commercially available products of the component (D): Irgacure™ 184, 651, 500, 907 (Ciba Specialty Chemicals Co., Ltd.), Lucirin TPO™ LR8728, Lucirin TPO LR8953X (BASF), Darocure™ 1116, 1173 (Ciba Specialty Chemicals Co., Ltd.), and Ubecryl™ P36 (UCB Co.).

These compounds for the component (D) may be used either individually or in combinations of two or more.

The proportion of the component (D) used in the composition of the present invention is usually 0.1–10 wt %, and preferably 1–5 wt %.

A photosensitizer can be used together with the radiation-active initiator of the component (D) as required. As examples of the photosensitizers, triethylamine, diethylamine, N-methyldiethanoleamine, ethanolamine, 4-dimethylaminobenzoic acid, 4-ethyl dimethylaminobenzoate, 4-isoamyl dimethylaminobenzoate, and commercially available products such as Ubecryl™ P102, 103, 104, 105 (UCB Co.), and the like can be given.

Other Components

Additives other than the above-mentioned components (A) to (D) may be optionally added to the composition of the present invention. Included in such additives are antioxidants, UV absorbers, light stabilizers, silane coupling agents, aging preventives, thermal polymerization inhibitors, leveling agents, coloring matters, surfactants, preservatives, plasticizers, lubricants, solvents, fillers, wettability improvers, coating surface improvers, and the like. As the antioxidants, for example, phenol-type antioxidants, organic sulfur-type antioxidants, and the like are given. These are commercially available under the trademarks Irganox 1010, 1035, 1076, and 1222 (Ciba Specialty Chemicals Co., Ltd.), and the like.

As the above-mentioned UV absorbers, benzotriaole-type UV absorbers, and the like can be given. As commercially available UV absorbers, Tinuvin™ P, 234, 320, 326, 327, 328, 213 (Ciba Specialty Chemicals Co., Ltd.), Sumisorb™ 110, 130, 140, 220, 250, 300, 320, 340, 350, 400 (Sumitomo Chemical Industries Co., Ltd.), and the like can be given.

As examples of the above-mentioned light stabilizers hindered amine-type light stabilizers and the like can be given. As commercially available products, Tinuvin™ 292, 144, 622LD (Ciba Specialty Chemicals Co., Ltd.), Sanol™ LS-770, 765, 292, 2626, 1114, 744 (Sankyo Co., Ltd.), and the like can be given.

As examples of the above-mentioned silane coupling agents, γ-aminopropyltriethoxysilane, γ-mercaptopropyltrimethoxysilane, and γ-methacryloxypropyltrimethoxysilane, as well as commercially available products under the trademarks SH6062, SZ6030 (Toray-Dow Corning Silicone Co., Ltd.), KBE903, KBM803 (Shin-Etsu Silicone Co., Ltd.), and the like can be given.

As examples of the above-mentioned aging preventives, phenol-type aging preventives, allyl amine-type aging preventives, and ketone amine-type aging preventives, as well as commercially available products under the trademarks Antigene W, S, P, 3C, 6C, RD-G, FR, AW (Sumitomo Chemical Industries Co., Ltd.), and the like can be given.

The composition of the present invention can be prepared by blending the above-mentioned components (A) to (D) and the optional components at appropriate proportions.

The viscosity (at 25° C.) of the composition of the present invention is in the range of 1,000–20,000 cP, and preferably 1,500–15,000 cP, to ensure excellent coatability to optical fibers.

Cured Products

The composition of the present invention is curable by irradiation with rays of an appropriate wavelenght, suitable radiation includes infrared radiation, visible rays, ultraviolet radiation, α-rays, β-rays, γ-rays, and the like. When ultraviolet radiation is used (which is preferred), for example, the composition can be cured at an irradiation dose of more than 2 mJ/cm². Preferably more than 50 J/cm² is used. If the irradiation dose is 50 mJ/cm² or more, preferably 100 mJ/cm² or more, the cured products exhibit a high breaking strength and a small amount of light transmission loss, in spite of a low modulus of elasticity. Generally, irradiation with 2 J/cm² or less is preferred, and 1 J/cm² or less is more preferred. Most preferably a dose of 50–200 mJ/cm² is used.

When the compositions of the present invention are cured with irradiation of ultraviolet light at a dose of 1 J/cm² in air atmosphere, those having (1) a secant modulus defined by the JIS K 7127 of 0.15 kg/mm² or less and (2) a tensile breaking strength, defined by the JIS K 7127, of 0.15 kg/mm² or more exhibit superior workability when the coating is to be stripped from optical fibers, without leaving any residue on the fibers. Because such a coating material provides an advantage of easy optical fiber joining work, the material is ideal for use as a primary coating for optical fibers. It is preferred to have cured products having a secant modulus of 0.12 kg/mm² or less, more preferably in the range of 0.05–0.1 kg/mm². It is preferred to have cured products having a tensile breaking strength of 0.18 kg/mm² or more, more preferably 0.21 kg/mm² or more, and most preferably in the range of 0.25–0.50 kg/mm². In addition, the cured products obtained by irradiation with ultraviolet lights under the same conditions as mentioned above, those having a total of two or more peaks or shoulders in the temperature range from −50° C. to +35° C. temperature dependency curve obtained from the loss tangent from temperature dependency measurement of dynamic viscoelasticity ratio, particularly, those having (a) at least one shoulder or peak in the temperature range from −50° C. to −20° C. and (b) at least one shoulder or peak in the temperature range from −20° C. to +35° C. exhibit exceptionally superior workability when the coating is stripped from optical fibers. Such a product is especially suitable as a primary coating material for optical fibers. Cured products satisfying both the above-mentioned requirements (1) and (2) at the same time, but having only one peak or shoulder in the temperature range from −50° C. to +35° C., exhibit somewhat inferior workability in coating removal from optical fibers as compared with those having two or more peaks or shoulders. Such cured products remain superior when compared with conventional primary coating material, and thus can be suitably used as a primary coating material for optical fibers.

Cured products having the above-mentioned secant moduli and tensile strengths at break are furthermore preferably used as a primary coating for optical fibers since they possess an appropriate modulus of elasticity and excellent breaking strength.

A coating layer of the composition in accordance with the present invention can have a thickness in the range of 5 to 500 μm, preferably 15 to 300 μm. A primary coating for optical glass fibers generally has a thickness in the range of 15–50 μm, for instance about 30 μm.

In a preferred form of the composition of the present invention, the composition comprises components (A), (B), (C), and (D) in ranges, relative to the total weight of the composition, of from 25 to 75% by weight, from 0.1 to 10% by weight, from 20 to 70% by weight, and 0.1 to 10% by weight, respectively. Preferred composition of the present invention include those having a viscosity of 1,000 to 20,000 cP at 25° C. The composition of the present invention is preferably adapted for use as a primary coating for optical fibers.

Utility

In addition to a coating material for optical fibers (particularly a primary coating material), the composition of the present invention is useful in paints, surface reforming agents, printing inks, and the like.

EXAMPLES

The composition of the present invention will now be described specifically by way of examples. In the following examples, "part(s)" means "part(s) by weight" unless otherwise indicated.

Synthetic Example 1 Synthesis of Polymers for Component (A)

A reaction vessel equipped with a stirrer was charged with 4.07 g of tolylene diisocyanate (containing 97.5 wt % or more 2,4-isomer and 2.5 wt % or less 2,6-isomer), 59.3 g of a ring-opening copolymer of ethylene oxide and tetrahydrofuran with a number average molecular weight (hereinafter abbreviated as Mn) of 4,000, 0.02 g of 2,6-di-t-butyl-p-cresol, and 0.007 g of phenothiazine. The mixture was cooled with ice to 10° C. or below while stirring. When the temperature was 10° C. or below, 0.08 g of dibutyl tin dilaurate was added and the mixture was stirred for two hours while maintaining the temperature at 20–30° C. Then, 0.33 g of γ-mercaptopropyltrimethoxysilane (trademark: SH6062, manufactured by Toray-Dow Corning Silicone Co., Ltd.), which is a silane coupling agent, was added and the mixture was stirred for one hour at 40–50° C. Next, 1.15 g of 2-hydroxyethylacrylate was added and the mixture was stirred for 30 minutes at 45–55° C.

0.13 g of methanol was added to the reaction solution, followed by stirring for 4 hours at 55–60° C. The reaction was terminated when the residual isocyanate content was reduced to 0.1 wt % or less, thereby obtaining a liquid urethane acrylate polymer of the component (A) with a Mn of 8,327.

Examples 1–7, Comparative Examples 1–2

10 g of laurylacrylate (component (C)), 17 g of nonylphenol EO-modified (4 mole modified) acrylate (trademark: M113, manufactured by Toagosei Co., Ltd., component (C)), 5 g of N-vinylcaprolactam (component (C)), 0.8 g of Irganox 1035 as an antioxidant, 2 g of 2,4,6-trimethylbenzoyl diphenylphosphine oxide, and 0.15 g of diethylamine were added to 65 g of the liquid urethane acrylate polymer (component (A)) which was obtained in the Synthetic Example 1. The mixture was stirred while maintaining the temperature at 50–60° C. until a transparant homogeneous liquid (resin solution I) was obtained. Mixtures of 100 parts of the resin solution I and poly-functional monomers shown in Table 1 or, in the case of Comparative Examples, no monomer, or laurylacrylate instead of the poly-functional monomers, in the amount shown in Table 1, respectively, were stirred for 3 hours while maintaining the temperature at 50–60° C., thereby obtaining compositions for Examples 1–7 and Comparative Example 2. The viscosity of the resulting compositions at 25° C. was measured using a Brookfield type viscometer. The results are shown in Table 1, which indicates all compositions have a viscosity in the range from 5,000 to 6,000 cP. The resin solution I was used as is without adding a poly-functional monomer as the composition for Comparative Example 1.

TABLE 1

| | (B) Poly-functional monomer (parts) | Viscosity (cp/25° C.) |
|---|---|---|
| Example 1 | 1,6-Hexanediacrylate (0.8) | 5500 |
| Example 2 | Triethylene glycol diacrylate (3.0) | 5500 |
| Example 3 | 1,6-Hexanediol diacrylate (1.5) | 5500 |
| Example 4 | 1,9-Nonanediol diacrylate (3.0) | 5400 |
| Example 5 | Triethylene glycol diacrylate (1.0) | 5500 |
| Example 6 | Tricyclodecanedimethanol diacrylate (3.0) | 5400 |
| Example 7 | Triethylene glycol diacrylate (2.0) | 5500 |
| Comparative Example 1 | — | 5500 |
| Comparative Example 2 | Laurylacrylate (2.5) | 5400 |

Each liquid composition thus obtained in the Examples or Comparative Examples was applied to a sheet of glass using an applicator for producing a coating with a thickness of 250 μm. The coating was irradiated with ultraviolet light from a 3.5 KW metal halide lamp (SMX-3500/F-OS, manufactured by ORC Co., Ltd.) at a dose of 1 J/cm$^2$ in air to obtain a cured coating with a thickness of about 200 μm. The coating was conditioned at 23° C. and 50% RH (relative humidity) for 12 hours and cut into strips with a width of 0.3 cm. These strips were used as test specimens to measure the temperature dependency of loss tangent. Similar strips with a width of 0.6 cm were prepared as test specimens to measure modulus of elasticity and breaking strength. The results are shown in Table 2. In addition, 4-core ribbons were prepared to evaluate ease of coating removal in one operation. The results are shown in Table 2.

Measurement of Modulus of Elasticity

Secant modulus was measured according to JIS K7127 at a bench mark distance of 25 mm and a pulling rate of 1 mm/minute. This Japanese Industrial Standard (JIS) specifies the a general tensile testing method of plastic films and sheets of 1 mm and under in thickness and includes the following guidelines:

The test pieces shall, as a rule, be conditioned prior to the test in the standard temperature and humidity condition Grade 2 (temperature of 23±2° C. and relative humidity of 50±5%) for 88 h or over (if it is ascertained that the measured values of test pieces conditioned for 88 h or over and those conditioned for 88 h or under do not differ from each other, the time of conditioning may be reduced).

The test shall, as a rule, be carried out in a room kept at the standard temperature and humidity condition Grade 2 (temperature of 23±2° C. and relative humidity of 50±5%).

A testing machine in which the travelling speed of cross head can be maintained constant during the test, and being constituted of the following shall be used.

(1) Grippers The grippers shall consist of two metal ones which can hold a test piece at the moving part and the stationary part of the testing machine. The test piece shall be attached to the moving part and the stationary part of the testing machine so as when load is applied during the test, the longitudinal axis of the test piece and the imaginary centre line of the two grippers align in a straight line.

The grippers should preferably be of the self-aligning type. The grippers shall not cause a slip of the test piece during the test and an oblique stressing of the test piece until it breaks.

Further, the gripping surface of the grippers should preferably be such that it can apply a constant gripping pressure to the test piece during the test.

(2) Load Indicator The load indicator shall be the one which can record all of the tensile loads applied to the test piece during the test in correspondence with the lapse of testing time, and can indicate the load values with an accuracy of 1% or superior at the set testing speed.

The test pieces shall be prepared by cutting off them from the materials using a sharp edge a such as a razor edge or by punching. Test pieces having a notch in the cut surface shall not be used.

When marking the test pieces with bench marks, an ink or a crayon which does not affect the test pieces shall be used.

The bench marks shall not be provided by scratching or indenting the surface of test piece.

The number of test pieces shall be five or more.

Measure the width and thickness of the parallel portion of each test piece at three points, i.e., centre between the bench marks and mid points at equal distance from the respective two bench marks. Test pieces shall be measured with an accuracy of 0.1 mm or superior for the width and 0.001 mm for the thickness.

Mount the grip part of a test piece in the gripper of the testing machine. Attention shall be taken so that an imaginary line connecting two points at which two grippers are respectively attached to the testing machine is in alignment with a longitudinal axis of the test piece. In addition, the test piece shall be gripped firmly so as not to slip in the grippers. In this case, in order to eliminate the influence of grippers on the test piece, papers or rubber sheets may be inserted between the test piece and the grippers.

After setting the testing speed to a specified value, start the testing machine.

Measurement of Breaking Strength

Tensile breaking strength was measured according to above-mentioned method JIS K7127, except that the method was performed at a bench mark distance of 25 mm and a pulling rate of 50 mm/minute under the conditions of 23° C. and 50% RH.

Temperature Dependency of Loss Tangent

Dynamic viscoelasticity analysis was used to determine the temperature dependency of loss tangent (which is also referred to as the temperature dependency of tan δ or the temperature dependency of the ratio of the storage modulus E' to the loss modulus E"). The dynamic viscoelasticity was measured using RHEOVIBRON MODEL RHEO-1021 (control unit) and RHEOVIBRON MODEL DDV-01FP (measuring unit) manufactured by Orientech Co., Ltd. at a heating rate of 2° C./min, bench mark distance of 30 mm, vibration frequency of 35 Hz, vibration swing of 10 μm, and a temperature range from −100° C. to 100° C.

Evaluation of Ease of Coating Removal from Optical Fibers

A four-core ribbon was nipped with a hot stripper S-214, manufactured by FURUKAWA ELECTRIC CO.,LTD., for about 5 minutes at a temperature range of 85±2° C. Glass core fibers were extracted from the 4-core ribbon to observe remains of the primary coating on extracted glass fibers. The coating removability was rated as "Excellent" when there were no remains of the primary coating material left on the surface of the glass fiber, "Good" when there was a small amount of remains, and "Bad" when the remains are significant.

TABLE 2

| | Secant modulus (kg/mm$^2$) | Tensile strength at break (kg/mm$^2$) | Temperature at which loss tangent exhibits a peak or shoulder (° C.) | Coating removability |
|---|---|---|---|---|
| Example 1 | 0.05 | 0.24 | −11 | Good |
| Example 2 | 0.07 | 0.15 | 0; −44 | Good |
| Example 3 | 0.06 | 0.48 | 5; −40 | Excellent |
| Example 4 | 0.07 | 0.42 | 7; −42 | Excellent |
| Example 5 | 0.06 | 0.37 | 1; −45 | Excellent |
| Example 6 | 0.08 | 0.34 | 8; −40 | Excellent |
| Example 7 | 0.10 | 0.28 | 4; −46 | Excellent |
| Comparative Example 1 | 0.04 | 0.06 | 2.7 | Bad |
| Comparative Example 2 | 0.04 | 0.05 | −7 | Bad |

As can be seen from Table 1, the compositions of Examples 1–7 have a viscosity of a desirable range as a primary coating for optical fibers. The following findings are obtained from the results shown in Table 2.

The cured product of Example 1 showed a high tensile breaking strength of 0.24 kg/mm$^2$, although the secant modulus was low (0.05 kg/mm$^2$). This cured product exhibited only one peak in the loss tangent temperature dependence curve. There were no other peaks or shoulders except for that one.

Figure 2:
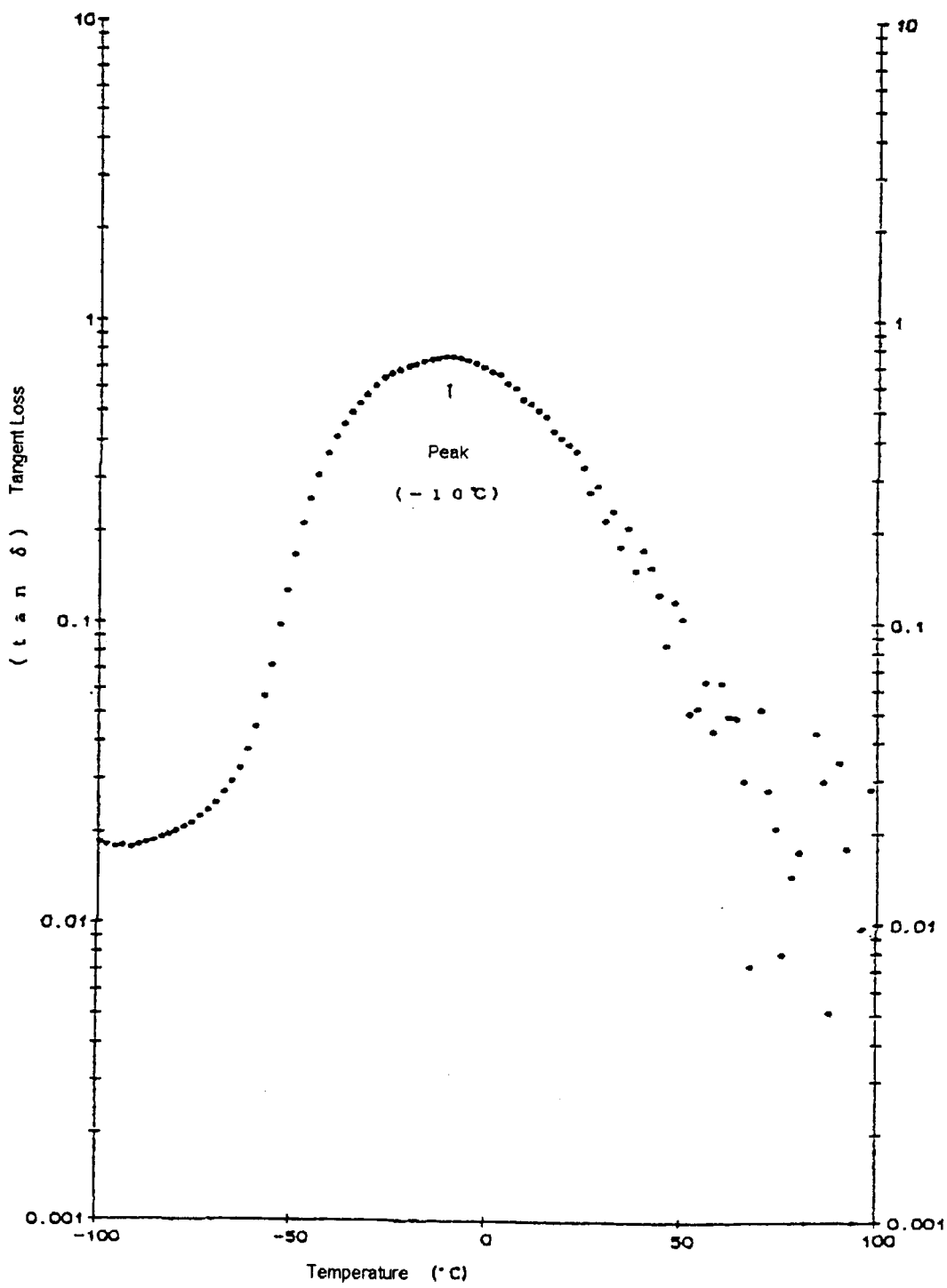
FIG. 2 shows a temperature dependency curve of loss tangent (plotted figure) of the cured product produced from the composition of obtained in Comparative Example 2.

The composition of Example 2 represents the composition having a tensile strength at break of 0.15 kg/mm$^2$; the loss tangent temperature dependence curve had one peak and one shoulder. Example 3 has one peak at 5° C. and one shoulder at −40° C. as shown in FIG. 1. With regard to the cured products made from the compositions of Examples 3 to 7, although the secant modulus was low (0.06–0.10 kg/mm$^2$), the products exhibited high tensile strength at break of 0.28–0.48 kg/mm$^2$. In addition, the loss tangent temperature dependence curves of these cured products showed one peak or shoulder in the temperature range from −50° C. to −20° C. and another peak or shoulder in the temperature range from −20° C. to +35° C. All cured products made from the resin compositions of the Examples 1 to 7 showed favorable coating removability from optical fibers. On the other hand, the cured products made from the compositions of Comparative Example 1 and Comparative Example 2 which do not contain a poly-functional monomer showed a low secant modulus and also a low tensile breaking strength. These products showed only one peak in the loss tangent temperature dependence curve (for example, the products of the Comparative Example 2 had only one peak at −10° C., as shown in FIG. 2). In the evaluation of coating removability, the primary coating made from the compositions of Comparative Examples left a significant amount of remains on optical fibers.

Effect of Invention

The radiation curable composition of the present invention possesses favorable viscoelasticity.and exhibits moderate resistance and deformation against external forces. Because of this, when used as a coating material, particularly a primary coating material, for optical fibers the products have a high breaking strength, while exhibiting a low modulus of elasticity, and showing superior light transmission characteristics with only a small amount of light transmission loss. In addition, removal of coating from optical fibers can be performed with extreme ease when optical fibers are joined together.

What is claimed is:

1. A coated optical fiber comprising:
    a coating having a secant modulus of 0.15 kg/mm$^2$ or less and a tensile strength of 0.15 kg/mm$^2$ or more, wherein said coating is obtained by curing a radiation-curable composition comprising:
    (A) a polymer composition comprising one or more polymers having,
        (i) urethane bonds in a molecular chain, and
        (ii) a number average molecular weight of 3,000–30,000,
        wherein the polymer composition has on average 1.2 or more polymerizable unsaturated groups per polymer molecule;
    (B) 0.5–5 wt %, relative to the total weight of the composition, of poly-functional monomer having two or three polymerizable unsaturated groups;
    (C) 25–55 wt %, relative to the total weight of the composition, of monomer having one (meth)acryloyl group; and
    (D) a radiation-active initiator.

2. The fiber of claim 1, wherein said coating has a secant modulus of 0.12 kg/mm$^3$ or less.

3. The fiber of claim 1, wherein said coating has a secant modulus in the range of 0.05–0.1 kg/mm$^2$.

4. The fiber of claim 1, wherein said coating has a tensile strength of 0.18 kg/mm$^2$ or more.

5. The fiber of claim 1, wherein said coating has a tensile strength of 0.21 kg/mm$^2$ or more.

6. The fiber of claim 1, wherein said coating has a tensile strength in the range of 0.25–0.50 kg/mm$^2$.

7. The fiber of claim 1, wherein said coating has a thickness in the range of 15–50 μm.

8. The fiber of claim 1, wherein a curve obtained by plotting the loss tangent of said coating versus the temperature of said coating at the temperature range from −50° C. to +35° C. has
    at least one peak and at least one shoulder, or
    at least two peaks.

9. The fiber of claim 8, wherein said coating has:
    at least one shoulder or peak in a temperature range from −50° C. to −20° C. in a temperature dependency curve of loss tangent; and
    at least one shoulder or peak in a temperature range from −20° C. to +35° C. in a temperature dependency curve of loss tangent.

10. The fiber of claim 1, wherein said one or more polymers are formed by reacting:
    (a) a polyether polyol obtained by a ring-opening copolymerization of two or more ion-polymerizable cyclic compounds;
    (b) a polyisocyanate; and
    (c) a (meth)acrylic compound having a hydroxyl group.

11. The fiber of claim 10, wherein said two or more ion-polymerizable cyclic compounds include tetrahydrofuran and ethylene oxide.

12. The fiber of claim 1, wherein the polymer composition (A) comprises a polymer derived from a polyoxyalkylene polyether polyol.

13. The fiber of claim 1, wherein the polymer composition includes at least one polymer having 2–10 urethane bonds.

14. The fiber of claim 1, wherein the radiation-curable compostion comprises, relative to the total radiation-curable composition, between 40 and 70% wt of the polymer composition (A).

15. The coated optical fiber of claim 1, wherein said radiation-curable composition comprises a monomer having a polymerizable vinyl group.

16. A radiation curable resin composition comprising:
- (A) a polymer containing polymerizable unsaturated groups in an average amount of 1.2–4 per one molecule, a urethane bond in a molecular chain, and having a number average molecular weight from 3,000 to 30,000,
- (B) 0.5–5 wt %, relative to the total weight of the composition, of poly-functional monomer having two or three polymerizable unsaturated groups;
- (C) 25–55 wt %, relative to the total weight of the composition, of monomer having one (meth)acryloyl group; and
- (D) a radiation-active initiator, wherein said resin composition after irradiation with a dose of 1 J/cm$^2$ ultraviolet radiation in air has a secant modulus of 0.15 kg/mm$^2$ or less and a tensile strength of 0.15 kg/mm$^2$ or more.

17. The composition of claim 16, wherein, after curing said composition, a curve obtained by plotting the loss tangent of the cured composition versus the temperature of the cured composition at the temperature range from −50° C. to +35° C. has a total of at least one peak and at least one shoulder, or at least two peaks.

18. The composition of claim 17, wherein said curve has at least one peak or shoulder in a temperature range from −50° C. to −20° C. and at least one peak or shoulder in a temperature range from −20° C. to +35° C. in the temperature dependency curve of loss tangent.

19. The composition of claim 16, wherein the composition comprises, relative to the total weight of the composition:
- (A) 25 to 75 wt % of a polymer containing polymerizable unsaturated groups in an average amount of 1.2–4 per molecule, a urethane bond and a polyoxyalkylene structure in a molecular chain, and having an average molecular weight from 3,000 to 30,000,
- (B) 0.5–5 wt % of poly-functional monomer having 2 to 6 polymerizable unsaturated groups,
- (C) 25–55 wt % of monomer having one (meth)acryloyl group, and
- (D) 0.1 to 10 wt % of a radiation-active initiator.

20. The composition of claim 16, wherein the polymer (A) possesses an average of 1.5–2.5 polymerizable unsaturated groups per molecule.

21. The composition of claim 16, wherein the component (B) is selected from the group consisting of diacrylate compounds and triacylate compounds having a molecular weight of 800 or less.

22. The composition of claim 16, wherein the component (B) is selected from the group consisting of 1,6-hexanedioldiacrylate, 1,9-nonanediolacrylate, triethylene glycol diacrylate, tricyclodecanedimethanol diacrylate, and trimethylolpropane alkoxytriacylate.

23. The composition of claim 16, wherein the component (C) has a molecular weight of 100–1000.

24. The composition of claim 16, wherein said radiation-curable composition includes at least one N-vinyllactam.

25. The composition of claim 16, wherein said radiation-curable composition includes at least one N-vinyllactam and at least one monomer having an alicyclic structure.

* * * * *